May 24, 1938. T. R. CAMP 2,118,157
APPARATUS FOR PURIFYING LIQUIDS
Filed Dec. 24, 1934 3 Sheets-Sheet 1
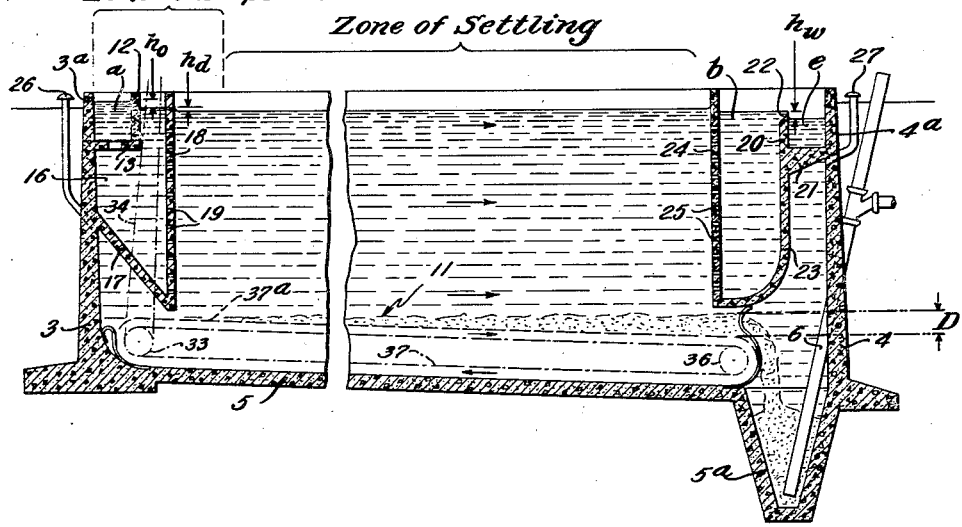
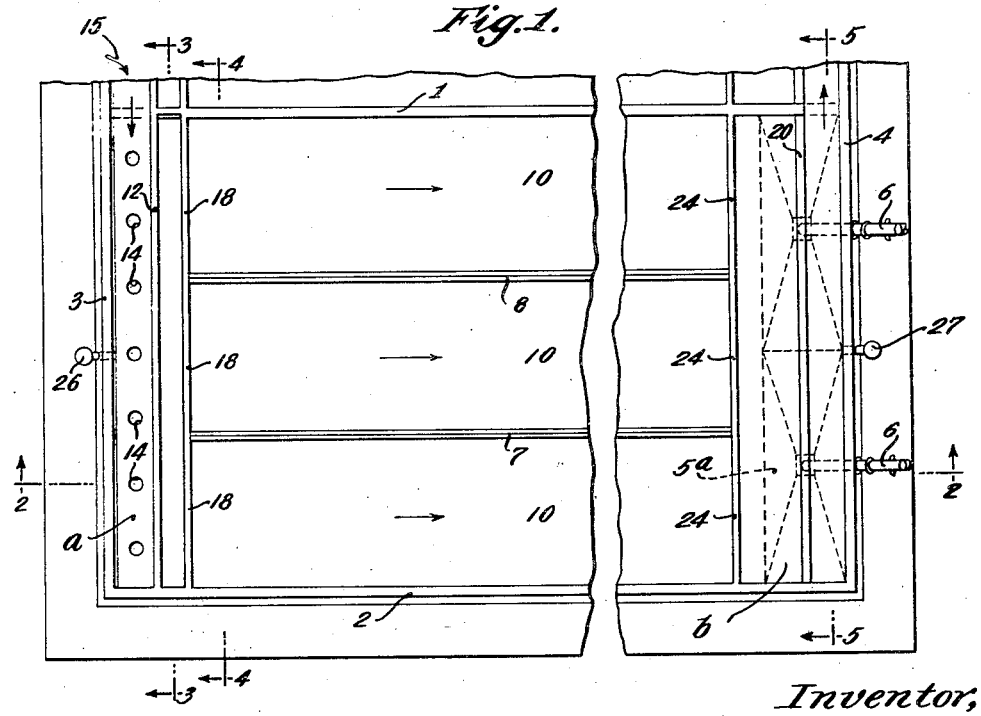
Inventor,
Thomas R. Camp,
by Roberts Cushman & Woodberry
Attys.

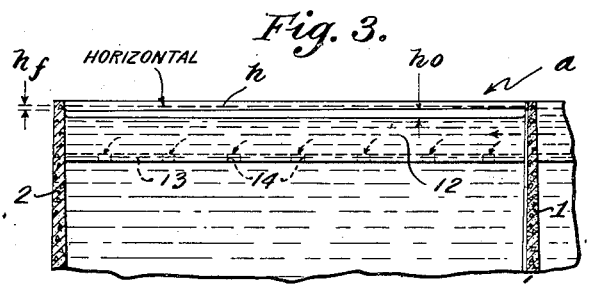
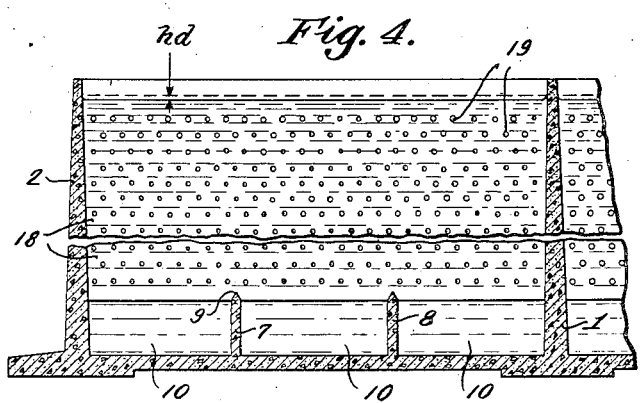
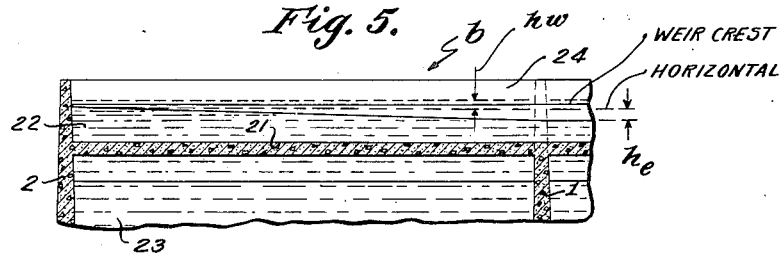

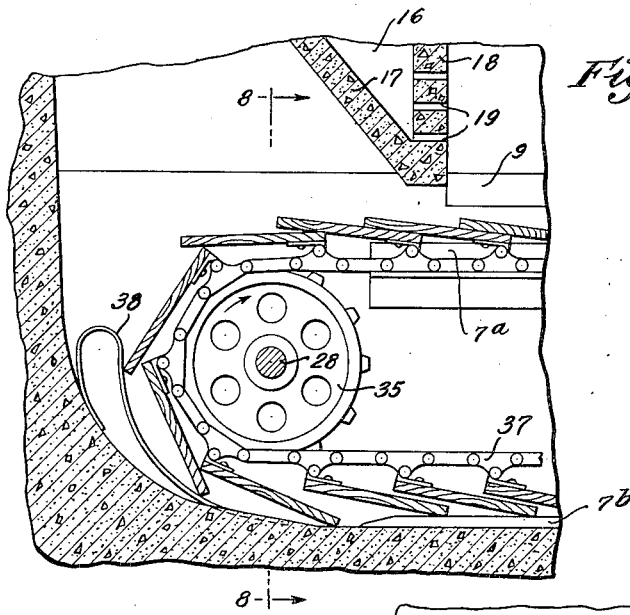
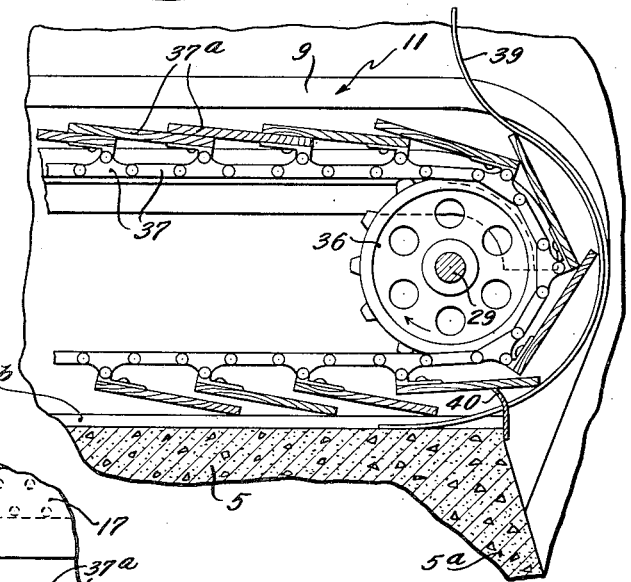
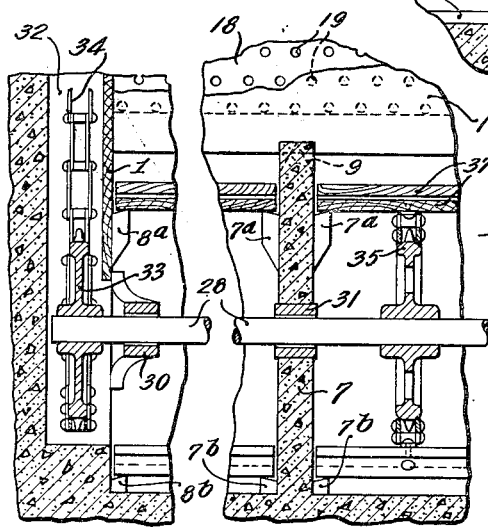

UNITED STATES PATENT OFFICE 2,118,157

APPARATUS FOR PURIFYING LIQUIDS

Thomas R. Camp, Newton, Mass., assignor to The Jeffrey Manufacturing Company, a corporation of Ohio Application December 24, 1934, Serial No. 758,920

18 Claims. (Cl. 210—55)

This invention pertains to apparatus for use in the purification of liquids containing suspended particles by the method of settling, and relates more particularly to apparatus of the horizontal, continuous flow type useful in the purification of drinking or industrial waters, sewage or the like.

Such apparatus usually comprises a tank or receptacle of large superficial area as compared with its depth, and the material to be treated enters at a predetermined part of the tank and, while depositing its suspended particles, moves slowly toward another part of the tank, from the latter of which it is discharged.

For maximum efficiency in the settling process it is essential that both the fluid and the particles suspended therein be distributed as uniformly as possible over the entire width of the tank at the influent end; that after entering the settling zone, the fluid move slowly and uniformly without eddies or substantial change in direction toward the effluent end of the tank; that the purified liquid leave the effluent end of the tank with substantially the same velocity at all points in the vertical cross-sectional area of the tank; and that the solids which accumulate in the lower part of the tank be removed therefrom without substantially disturbing the fluid in the settling zone so that such solids do not intermingle with the purified effluent liquid.

The present invention has for its principal object the provision of apparatus so designed as substantially to meet all of the above requirements for maximum efficiency of purification by settling and the accomplishment of this result by means of a simple, inexpensive and practical device adapted to operate continuously and substantially automatically. While herein illustrated as embodied in a tank of the kind in which the liquid enters at one end and discharges from the opposite end, I contemplate the use of the invention in tanks of other type, for example radial flow tanks.

Other objects and advantages of the invention will be made apparent by consideration of the accompanying drawings and the subsequent more detailed description.

In the drawings, wherein one desirable embodiment of the invention is illustrated by way of example, Fig. 1 is a fragmentary diagrammatic plan view of one unit of my improved apparatus;

Fig. 2 is a vertical section substantially on the line 2—2 of Fig. 1;

Fig. 3 is a fragmentary vertical section substantially on the line 3—3 of Fig. 1;

Fig. 4 is a fragmentary vertical section substantially on the line 4—4 of Fig. 1;

Fig. 5 is a fragmentary vertical section substantially on the line 5—5 of Fig. 1;

Fig. 6 is a fragmentary vertical section, substantially in the same vertical plane as that of Fig. 2, but to larger scale, illustrating desirable details of construction at the influent end of the tank;

Fig. 7 is a view similar to Fig. 6, but showing desirable details of construction at the effluent end of the tank; and Fig. 8 is a section substantially on the line 8—8 of Fig. 6.

As here illustrated the tank and the distributing devices are made of masonry, for example cement concrete, although it is to be understood that the apparatus may be embodied in other materials, for example metal, if desired. In the drawings I have illustrated one unit of my improved apparatus in detail, but with the understanding that as many such units may be spaced side by side or in any other desirable relation as may be necessary or desirable for the treatment of the quantity of liquid to be purified.

As here shown, the tank comprises the vertical side walls 1 and 2, the end walls 3 and 4, and the bottom 5 comprising a downwardly directed portion $5^a$ defining a gutter or sump at the effluent end of the tank. The side, end and bottom members are here shown as of monolithic construction, but the several elements of the tank may be formed independently if desired, and appropriately united in a manner suitable to the material employed. The bottom 5 of the tank preferably slopes slightly from the influent toward the effluent end, the gutter at the latter end being designed to receive the sludge which accumulates in the lower part of the tank, and from this gutter the sludge may be removed through appropriate pipes 6 or otherwise, as desired.

Since the tank may be of great width, I prefer to divide it by means of upstanding curb walls 7 and 8 (which may be integral with the bottom 5 and which preferably are beveled at their upper edges, as shown at 9) so as to provide a plurality of parallel channels 10 extending longitudinally of the tank for the reception of the moving floor elements 11 hereinafter to be described and which, in effect, collectively constitute a movable bottom wall or floor for the tank. The curb walls 7 and 8, and the side walls of the tank carry rails $7^a$, 7$^b$, and 8$^a$, 8$^b$, respectively (Fig. 8) preferably having narrow upper edges, which support the flights of the moving floor, hereafter described, the narrow edges of the rails permitting the flights to slide along them without undue frictional resistance.

For conveniently delivering and distributing the influent fluid, I preferably employ a flume $a$ extending transversely across the entire width of the tank at the influent end, such flume being conveniently formed by means of a vertical wall 12 extending transversely across the width of the tank and horizontally spaced from the upper portion 3$^a$ of the end wall 3 and connected with the latter by a bottom wall 13, the latter being furnished with a series of orifices 14 of substantially uniform size through which the influent material, flowing in the flume, is discharged downwardly into the distributing chamber 16. This distributing chamber is conveniently defined by an inclined diaphragm wall 17 extending transversely across the width of the tank and united at its upper edge to the end wall 3 and at its lower edge to a substantially vertical dispersion wall 18 provided with a multitude of minute orifices 19. This wall 18 extends up above the level of the liquid in the tank and downwardly to a point just above the floor or bottom wall 11.

At the effluent end of the tank I preferably provide a discharge flume $e$ extending transversely across the width of the tank and defined by a substantially vertical wall 20 horizontally spaced from the upper part 4$^a$ of the end wall 4 and united to the latter by a bottom wall 21. The upper edge of the wall 20 preferably is beveled, as shown at 22, to provide a weir over which the effluent fluid discharges into the flume, such weir extending transversely across the entire width of the tank. The wall 20 is continued downwardly below the bottom 21 of the flume to form the diaphragm 23, reaching downwardly almost to the floor or bottom wall 11 and is united to the lower edge of a vertical collection wall 24 provided with a multitude of small orifices 25 which permit the liquid within the tank proper to flow outwardly into the collection chamber $b$ between the diaphragm 23 and the wall 24 and thence upwardly to the weir edge 22. If the apparatus be employed for the purification of sewage or other substances which evolve gases or vapors, I preferably provide gas vents 26 and 27 leading from the spaces beneath the diaphragm walls 17 and 23, respectively.

Referring to Figs. 6 to 8, each section of the floor 11 preferably is arranged to move slowly from the influent end of the tank toward the effluent end. With this object in view, I preferably provide the tank with transversely extending shafts 28 and 29 adjacent to its influent and effluent ends, respectively. These shafts are arranged near the tank bottom and turn in bearings 30 carried by the side walls of the tank and also in bearings 31 in the curbs 7 and 8. One of these shafts, for example that at the influent end of the tank, projects outwardly beyond one of the bearings 30 and into a well 32 (Fig. 8) which may be formed within the thickness of one of the side walls or otherwise provided and separated from the tank proper by a suitable partition or portion of the wall material. Within this well the shaft is provided with a sprocket wheel 33 which receives a chain 34 leading to another sprocket wheel (not shown) which is driven at the desired speed by means of any appropriate motive power, for example, by an electric motor actuating the drive sprocket through a reduction gearing of any appropriate type.

The shaft 28 is provided with sprocket wheels 35 and the shaft 29 with corresponding sprocket wheels 36 and these sprocket wheels support and drive endless chains 37 which support a series of flights 37$^a$, preferably pivotally secured to the chain links and adapted, in traversing the upper run of the chain, to overlap, as shown in Figs. 6 and 7, so as collectively to form the moving floor or bottom wall 11 upon which the suspended particles in the liquid are deposited. These flights may be made of any appropriate material, for example, wood, metal or the like, but preferably of sufficient rigidity to avoid sagging, the ends of the flights of the upper run of the floor sliding along the rails 7$^a$, 8$^a$ as above described, while the ends of the flights in the lower run of the floor slide along the rails 7$^b$, 8$^b$. While a moving floor thus constructed is desirable for the purpose, I contemplate that the floor may be made otherwise, for example, as a continuous, uninterrupted length of flexible material such as rubber, canvas or the like, passing about rollers or pulleys at the opposite ends of the tank, such an arrangement being a well known equivalent as a conveying means for that herein specifically illustrated.

Preferably at the influent end of the tank, where the flights 37$^a$ are moving upwardly, I provide a resilient guard member 38 (Fig. 6) for contact with the flights to prevent deposit of sludge below the lower run of the movable floor or conveyor. At the effluent end I preferably provide spring members 39 which engage the flights as the latter descend to keep the latter under proper control and to prevent them from swinging downwardly too far as they near the horizontal plane. Preferably also I provide a flexible scraper member 40 which engages each flight as the latter approaches the horizontal so as to clean off any adhering sludge and to prevent entry of sludge beneath the floor.

In order that the apparatus, as above described, may function for its intended purpose, it should be designed in accordance with certain definite principles. As already noted, maximum efficiency in the settling process requires that both liquid and suspended matter be dispersed uniformly over the cross sectional area of the tank at the influent end. This dispersion is accomplished in that portion of the tank which is indicated as the "Zone of dispersion" in Fig. 2. The liquid to be purified is normally supplied to the tank through a conduit or conduits of relatively small size in which it flows at a velocity high enough to prevent deposit of the suspended material. For most suspensions this velocity must be in excess of 0.5 foot per second.

In some purification processes, where it is difficult to design the conduits in such a manner as to maintain a velocity high enough to prevent settling of the suspended material, mechanical agitation of the flowing suspension may be resorted to, as, for example, by injection of air into the bottom of the conduits, as is sometimes practiced in activated sludge plants. In all cases, however, the cross-sectional area of the influent conduits is very small as compared to the cross-sectional area of the settling tanks.

The first problem is to disperse the material delivered through the influent conduits in as uniform a manner as possible over the entire transverse cross-sectional area of the tank at the influent end. As herein illustrated, the first step in this dispersion is accomplished by means of the the wall at some other point, the net difference in velocity would be approximately 1 foot per second, with a corresponding difference in velocity head of 0.015 foot. If this represents the total difference $h_c$ in energy head available to produce flow through the orifice 19, the lost head through the wall 18 represented by $h_d$ should be not less than 0.042 foot in order to avoid a variation of more than 20% in the discharge through the several orifices 19. This head loss corresponds to a velocity through the orifices in the wall 18 of approximately 1.2 feet per second. If the desired velocity in the settling zone is 0.6 foot per minute, the ratio of tank cross-sectional area to orifice area will be 120:1.

While I am aware that perforated walls have heretofore been used at the inner ends of settling tanks, I believe that it has been the universal practice to make the ratio of orifice area to total wall area quite high, for example, as much as 50% with the object of keeping the velocity through the orifices so low that jets do not form. This prior practice is distinctly opposed to the principle of my present invention wherein I purposely employ jets of high velocity.

While it might be possible, in using the dispersion wall 18 with its small orifices 19, to dispense with the inlet orifices 14, in favor of a single large opening leading to the chamber 16, if it were merely desired to distribute a clear liquid uniformly in the settling tank, it is not feasible to do so when dealing with a liquid containing suspended particles. This is true by reason of the fact that the velocities in the dispersion chamber would not be high enough at all points to insure a uniform dispersion of suspended particles within the chamber 16. The orifices 14 effect a uniform dispersion of these particles over the tank width, and while the heavier particles will tend to settle toward the bottom of the chamber 16, the fact that more of these particles pass out through the lower part of the wall 18 than through the upper part of the latter is, if anything, advantageous toward effecting the rapid purification of the liquid. While the velocities in the orifices 14 and 19 are to be established by the dispersion principle above referred to, they should in general be kept as low as is consistent with said principle, since some types of suspended particle, for example, flocculent material such as may result from chemical coagulation or by the use of the activated sludge process, are fragile and may be broken if the orifice velocities are too high. However, velocities of the order of 1.5 feet per second are not excessive for most materials to be treated.

The size of the wall orifices 19 should be small in order that they may be close together, but this size will depend to some extent on the size of the suspended particles which must pass through. For water treatment, holes ½ inch or smaller in diameter may be desirable, whereas for sewage treatment holes as large as 1 or 2 inches in diameter may be required, dependent upon the character of the pretreatment.

By reason of the turbulence set up by the jets emerging from the orifices 19, effective settling does not occur immediately in front of the wall 18, and before settling can take place the high velocity of the fluid issuing through these orifices must be reduced by dispersion of the liquid over the cross-sectional area assigned to each jet. The closer the spacing of the jets the less will be the space in front of the wall 18 necessary for this lateral dispersion. Beyond the plane where dispersion is effected eddying continues for a distance about equal to the space required for such dispersion. Beyond this point uniform forward motion of the liquid takes place throughout the settling zone, which extends throughout the major part of the length of the tank.

After a substantially uniform forward motion of the liquid in the horizontal direction has been set up, such motion will continue unless interferred with by the application of forces. Each settling particle will move along a path which is the resultant of its own settling velocity and the velocity of motion of the liquid which surrounds the particle. Hence the complete absence of upward motion of the liquid is desirable in order that the particles may settle quickly. While a downward motion might increase the rapidity of settling, such a downward flow tends to interfere with the proper separation of the purified liquid from the sludge.

Within the zone of settling the forces which tend to influence the direction of flow are the friction forces due to contact of the liquid with the walls of the tank and with the atmosphere of the liquid surface or resulting from the effects of objects moving within the body of the liquid. In order to avoid the last-named effect, it is desirable to avoid the introduction of any sludge removing mechanism moving with a velocity or in a direction different from that of the liquid. In order to avoid the effects of moving currents of air upon the upper surface of the liquid, I deem it desirable to provide the tank with an appropriate cover or roof (not herein illustrated), and to minimize the effects of the friction of the normally stationary side walls it is desirable to make the depth of the tank small as compared to its width. In order to avoid substantial friction on the bottom or floor of the tank I provide the moving floor 11 above described. This floor preferably moves lengthwise of the tank at substantially the same velocity as the fluid. While I prefer such a moving floor, in order to avoid setting up frictional forces in the liquid, it may be desirable to employ a stationary floor when the rate of accumulation of sludge is very slow, and to provide such fixed floor or bottom with suitable slopes and drains for the accumulation and removal of the sludge.

In order that the fluid flow may not be disturbed at the effluent end of the tank, I provide for the collection of the purified fluid by means employing the same dispersion principle as that used in the influent end. For this purpose the wall 24 above described is constructed similarly to the wall 18 and is provided with a large number of small and closely spaced orifices 25 whose aggregate area is small as compared with the vertical area of the tank. This arrangement results in the delivery of the fluid in the form of small jets of relatively high velocity into the collection chamber between the walls 23 and 24. If an effluent weir alone were used at the delivery end of the tank there would be a tendency for the liquid to short circuit toward the top of the tank with consequent disturbance of the liquid and the tendency to prevent the deposit of particles which otherwise would have settled to the bottom. By the use of the wall 24 I avoid any disturbance of the normal horizontal flow of fluid in the zone of settling.

As above described, and as illustrated in Fig. 2, the fluid which enters the collection chamber between the walls 23 and 24 preferably is delivered over the effluent weir 22 into a flume $e$ extending transversely of the width of the tank. Prefer-transverse flume $a$ defined by the walls 12, 13 and $3^a$ above described. While such a flume is desirable as a means for distributing the material transversely across the tank, it is not essential, nor if such flume be used is it necessary that the liquid enter at one end only. Results quite similar to those secured by the employment of the flume may be obtained by providing the end wall $3^a$ of the tank with openings, orifices or gates properly designed and distributed to secure proper dispersion of both the liquid and its suspended particles, with the understanding that these openings, orifices or gates be designed in accordance with the principle herein described with reference to the employment of the flume $a$. Gates may likewise be used in the wall 12, instead of the orifices 14, with satisfactory results, if designed in accordance with the principles herein described.

Referring more particularly to Fig. 3, which illustrates a vertical cross section transversely of the tank and longitudinally through the flume $a$, it will be apparent that as the fluid flows along this flume from right to left, its velocity is decreased at each of the successive orifices 14, because of the lateral flow through the orifices. The velocity head in the flume is thus decreased with a corresponding increase in pressure head. The increase in pressure head tends to make the water surface higher at the left-hand or lower end of the flume, but this tendency will be offset more or less by friction losses in the flume. If the friction losses in the flume exceed the velocity head at the entrance to the flume, the water surface will drop in the direction of flow. If the velocity head at the entrance exceeds the friction losses in the flume, the water surface will rise in the direction of flow. The maximum difference in elevation of the fluid surface in either case will be of the same order of magnitude as the entrance velocity head. In Fig. 3 the water surface in the flume is indicated by the line $h$ and is shown in this case as dropping in the direction of flow. The total amount of drop between the right and left-hand ends of the flume is indicated by the character $h_f$. As the fluid passes through the orifices 14 it suffers a head loss $h_0$ which is equal to the difference in water level at the entering and exit sides of the orifice. Since, as above noted, the water level is not the same in the flume $a$ above all of the orifices, the value $h_0$ will not be the same for all orifices. Preferably, for ease in construction, the orifices 14 are all of substantially the same area, and thus if the value $h_0$ is different for different orifices their discharge rates will differ. In order to obtain as small a difference as is practicable in the quantity of fluid discharged from the several orifices, thereby to insure uniformity of distribution transversely of the tank, the value $h_0$ should be large as compared with $h_f$.

For any value of $h_f$ as estimated in the design of a particular influent flume or conduit, the required value of $h_0$ may be computed from the formula $$\frac{h_0}{h_0 - h_f} = \left[\frac{100 - P}{100} q\right]^2$$

where $q$ is the discharge per orifice and $P$ is the permissible percentage variation in the discharge. This equation is applicable for openings of the orifice type with which the head loss varies as the square of the discharge. Inasmuch as this same relation between head loss and discharge holds very closely with gates, whether or not they are open at the water surface, the above equation may also be used to compute the head loss required through gates set in wall 12 or in the end wall 3. The above formula is a mathematical statement of the aforementioned principle of dispersion. The character $h_f$ denotes in general the difference in energy head available for flow through the orifices or gates. Whenever the word "orifice" appears herein with reference to an inlet opening, it is to be understood to include openings commonly called gates or sluice gates. From the formula, a 10% variation in $q$ [that is to say P=10] requires that $h_0 = 5.2 h_f$; a 20% variation requires that $h_0 = 2.78 h_f$; and a 50% variation requires that $h_0 = 1.33 h_f$.

If $h_f$ is estimated as 0.04 foot for a particular case, then to assure a variation in orifice discharge of not more than 20%, the value $h_0$ must be not less than 0.11 foot. This loss of head for a given orifice corresponds with an orifice velocity of about 2.0 feet per second. It will thus be apparent that for uniform distribution under conditions met with in practice, as above noted, the velocities through orifices 14 must be of substantial amount, with a corresponding high head loss.

Having secured substantially uniform distribution of both liquid and suspended particles transversely of the tank it becomes necessary to disperse the liquid and the suspended particles as uniformly as possible, over the entire cross-sectional area of the tank and to direct the flow horizontally. This object is accomplished by applying the above principle of dispersion by the use of high velocity jets and high head losses for a second time in delivering the fluid through the orifices 19 in the wall 18 into the tank proper. This wall 18, as above described, is substantially vertical, that is to say, perpendicular to the direction of flow in the tank and it extends over substantially the entire vertical cross-sectional area through which it is desired that flow take place. The orifices 19 are relatively small in individual area and are distributed as uniformly as possible over the area of the wall 18, and the fluid from the dispersion chamber 16 must pass through these orifices in entering that portion of the tank in which settling takes place.

Because of the high velocity with which the fluid from the flume $a$ enters the dispersion chamber 16, the liquid in the latter chamber is in turbulent motion and the energy available for flow through the orifices 19 in the wall 18 will therefore vary substantially for different orifices. Applying the principle of uniform dispersion above described, the loss of head in passing through these orifices should be great as compared to the difference in energy available for causing flow through the several orifices. Generally the velocity through the orifices 19 should exceed 0.5 foot per second, and this will produce distinct jets where the fluid enters the tank proper. Inasmuch as the velocity in the tank where settling is to take place should ordinarily not exceed 3 feet per minute, and preferably should be much less,—a ratio of tank cross-sectional area to orifice area in excess of 10 to 1 should be provided. This ratio may be as high as 200 to 1,—in some cases where a very low velocity is required in the settling zone.

For example, if the eddies produced by the discharge from the flume $a$ into the chamber 16 result in a velocity of approach of the fluid toward the wall 18 of 0.5 foot per second, at one point, with a corresponding velocity away from ably the weir 22 is not submerged, and if this weir is actually horizontal and carefully constructed the discharge will be substantially uniform over the full width of the collection chamber.

If it be required to operate the effluent weir wholly or partially submerged, then because of the drop $h_e$ (Fig. 5) in the effluent flume the liquid will be short circuited toward the down-stream end of the effluent weir. A greater variation in energy content of the liquid will thus be produced on the down-stream side of the collection wall 24. For uniform collection over the entire cross-sectional area of the tank, a greater head loss through the wall 24 would be required than is the case with an unsubmerged weir and for this reason I prefer the unsubmerged effluent weir. The amount of free fall provided over this weir is determined from the velocity thus imparted to the fluid, and this in turn may be limited by the character of the suspended particles. For example, if the particles which remain in the water at this point are such that they should not be further broken up, the velocity over the effluent weir should not exceed the limiting velocity for preventing breaking of these particles. For example, if it be found that a velocity of 2 feet per second is permissible, the corresponding velocity head or permissible fall is of the order of 0.06 foot. This will mean that the head $h_w$ on the weir (Fig. 2) plus the drop $h_e$ in the flume should be less than 0.06 foot.

While as shown the effluent flume discharges at one end it is obvious that it may discharge at one or more points through the side wall if desired.

The sludge settles upon the moving floor 11 in such a manner as to produce a maximum sludge depth, as represented by the letter D. The depth of sludge at this point may be estimated from a knowledge of the amount of solids to be deposited and the water content of the sludge, for example, if the tank is to be used for primary settling of sewage containing 600 parts per million of suspended solids, of which 90% are to be removed by settling and thereby producing sludge of 96% water content, and if the settling compartment be eight feet deep, then $$D = 8 \times 62.5 \times 0.90 \times \frac{600}{1,000,000} \times \frac{1}{1-0.96} \times$$

$$\frac{1}{62.5 \times 1.03} = 0.105 \text{ foot}$$

This is based upon an estimated specific gravity of the wet sludge of 1.03.

As a second example, if the tank is to be used as the final settling tank in an activated sludge system in which the mixed liquor contains 5000 parts per million of suspended solids, substantially all of which are to be removed to produce a sludge of 98% water content and specific gravity of 1.02, then $$D = 8 \times 62.5 \times \frac{5000}{1,000,000} \times \frac{1}{1-0.98} \times$$

$$\frac{1}{62.5 \times 1.02} = 1.96 \text{ feet.}$$

If in this last example the floor is moved at half the linear velocity of the liquid in the tank, each square foot of floor will receive the solids from two square feet of tank and the depth D will be twice as great, or 3.92 feet.

The above examples illustrate the necessity of providing in the design for the expected depth D of sludge and of operating the flow at a velocity which is high enough so that the sludge will never exceed this depth and thereby become mingled with and contaminate the effluent purified liquid.

The sludge drops from the floor 11 at the effluent end of the tank into the gutter at 5ᵃ from which it is pumped or otherwise withdrawn, for example, through the pipes 6. The floor 11 and its associated parts, for example, the curbs 7 and 8, and the guards 38 and 39, are so designed as to prevent, as far as is practicable, the entry of sludge beneath it. The space beneath the floor is wholly separated from the dispersion and collection chamber and is subjected to the pressure of the liquid within the settling compartment so that this space is free from eddy currents.

While I have illustrated one desirable embodiment of the invention by way of example, and have described its purpose,—and its mode of operation, I wish it to be understood that the invention is not necessarily limited to the precise arrangement shown, but that other and equivalent apparatus may be employed for the purpose and in the practice of my improved method. For example, the invention may be embodied in a radial flow tank wherein the fluid enters at a central point and moves radially out therefrom. Accordingly, when in the claims I make reference to "end walls" I wish this term to be understood as inclusive of cover in which one of such "end" walls is a centrally disposed cylindrical structure and the other "end" wall is an annular structure concentric with the first, and the "width" of the tank will then be the circumference of the tank at a selected radial distance from its center.

I claim:

1. Apparatus for use in the purification of liquid containing suspended matter, said apparatus comprising in combination a settling tank through which the liquid flows slowly, in a substantially horizontal direction in a stream whose depth is substantially less than its width, from one end of the tank toward the other, said tank having a moving floor, and means for moving said floor always in the direction of fluid flow thereby to reduce frictional resistance and prevent the formation of eddies in the liquid.

2. Apparatus for use in the purification of liquid containing suspended particles, which comprises in combination a settling tank through which the liquid flows slowly in a substantially horizontal direction from one end toward the other of the tank, means delivering liquid to the tank, and liquiding-collecting means constructed and arranged to cause the effluent liquid to flow out at substantially the same velocity over the entire vertical cross-sectional area of the effluent end of the tank.

3. Apparatus for use in the purification of liquid containing suspended particles, said apparatus comprising in combination a settling tank in which liquid flows slowly and without substantial change in direction, means for supplying the liquid to the tank, means providing a dispersion chamber at the influent end of the tank, distributing means operative to receive liquid from the supply means and to distribute liquid together with its suspended particles substantially uniformly transversely of the chamber, said chamber having a wall extending substantially from top to bottom of the tank and provided with small orifices so designed and arranged as to deliver the liquid substantially uniformly over the entire vertical cross-sectional area of the settling tank.

4. Apparatus for use in the purification of liquid containing suspended particles, said apparatus comprising in combination a settling tank in which liquid flows slowly and without substantial change in direction, means for supplying liquid to the tank, means providing a chamber at the influent end of the tank, said chamber having a substantially vertical wall extending from top to bottom of the tank, distributing means operative to receive liquid from the supply means and to distribute the liquid together with its suspended particles substantially uniformly across the width of the chamber, the vertical wall of the chamber being provided with a multitude of orifices of an aggregate area which is small as compared with the total area of the wall thereby to produce a high velocity of discharge through the orifices.

5. Apparatus for use in the purification of liquid containing suspended particles, said apparatus comprising in combination a settling tank in which the liquid moves slowly and without substantial change in direction, means for supplying liquid to the tank, means providing a chamber at the influent end of the tank, said chamber having a substantially vertical wall extending transversely across the width and substantially from top to bottom of the tank, distributing means operative to receive liquid from the supply means and to distribute such liquid together with its suspended particles substantially uniformly across the width of said chamber, the vertical wall of the chamber having a multitude of closely spaced orifices each of small size, the aggregate orifice area being not substantially more than 10% of the total transverse cross-sectional area of the tank.

6. Apparatus for use in the purification of liquid containing suspended particles, said apparatus comprising in combination a settling tank in which liquid moves slowly and without substantial change in direction, means for supplying liquid to the tank, means providing a dispersing chamber at the influent end of the tank, said chamber having a substantially vertical wall extending from side to side and substantially from top to bottom of the tank, distributing means operative to receive liquid from the supply means and to distribute such liquid with its suspended particles substantially uniformly across the width of the chamber, the vertical wall being provided with a multitude of small orifices the distributing means being so designed and dimensioned that with a maximum difference $h_c$ in energy head at different points in said chamber available for causing flow through the small orifices, the head loss $h_d$ through the orifices is represented by the expression $$\frac{h_d}{h_d - h_c} = \frac{q^2}{\left(\frac{100-P}{100}q\right)^2}$$

where $q$ is the discharge per unit of orifice area and P is the percentage variation in discharge.

7. Apparatus for use in the purification of liquid containing suspended particles, said apparatus comprising in combination a settling tank, means for supplying liquid to the tank, means which receives the fluid with its suspended particles and delivers it into the tank in jets of substantially uniform velocity throughout substantially the entire vertical cross-sectional area of the tank at the influent end of the latter, means adjacent to the effluent end of the tank operative to receive the purified fluid in the form of a multitude of small streams of substantially uniform velocity and distributed throughout substantially the entire vertical cross-sectional area of the tank, a moving floor for the tank upon which suspended particles may settle, means for moving the floor at substantially the same velocity and in the same direction as the fluid in that part of the tank at which settling takes place, and means operative to remove deposited settlings from the effluent end of the tank.

8. Apparatus for use in the purification of liquid containing suspended particles, said apparatus comprising in combination a settling tank, means for supplying liquid to the tank, means which receives the fluid with its suspended particles and delivers it into the tank in jets of substantially uniform velocity of at least 0.5 foot per second distributed uniformly throughout the entire vertical cross-sectional area of the tank, means at the effluent end of the tank constructed and arranged to receive the purified fluid in the form of a multitude of jets of substantially uniform velocity of at least 0.5 foot per second distributed substantially uniformly throughout the entire vertical cross-sectional area of the tank, and sludge-collecting means arranged in the lower part of the tank.

9. Apparatus for use in the purification of liquid containing suspended particles, said apparatus comprising in combination a settling tank, means for supplying liquid to the tank, means defining a dispersion chamber at one end of the tank constructed and arranged to deliver the liquid into the tank proper at substantially uniform velocity throughout the entire vertical cross-sectional area of the tank, means defining a collection chamber adjacent to the effluent end of the tank, said latter chamber being constructed and arranged to receive the liquid from the tank proper at substantially uniform velocity over the entire vertical cross-sectional area of the tank, the space between said chambers constituting a settling zone in which the fluid velocity is low and through which the liquid flows without substantial change in direction, and means for conducting fluid away from the collecting chamber.

10. Apparatus for use in the purification of liquid containing suspended particles, said apparatus comprising in combination a settling tank, means for supplying liquid to the tank, means defining a dispersion chamber at one end of the tank constructed and arranged to deliver the liquid into the tank proper at substantially uniform velocity throughout the entire vertical cross-sectional area of the tank, means defining a collection chamber adjacent to the effluent end of the tank, said latter chamber being constructed and arranged to receive the liquid from the tank proper at substantially uniform velocity over the entire vertical cross-sectional area of the tank, the space between said chambers constituting a settling zone in which the fluid velocity is low and through which the liquid flows without substantial change in direction, and means providing a discharge of fluid from the collecting chamber at substantially uniform velocity over the entire width of the latter.

11. Apparatus for use in the purification of liquid containing suspended particles, said apparatus comprising in combination a settling tank, means for supplying liquid to the tank, means defining a dispersion chamber at one end of the tank constructed and arranged to deliver the liquid into the tank proper at substantially uniform velocity throughout the entire vertical cross-sectional area of the tank, means defining a collection chamber adjacent to the effluent end of the tank, said latter chamber being constructed and arranged to receive the liquid from the tank proper at substantially uniform velocity over the entire vertical cross-sectional area of the tank, the space between said chambers constituting a settling zone in which the fluid velocity is low and in which the liquid flows without substantial change in direction, means for conducting fluid away from the collecting chamber, and a moving floor for the settling zone on which settlings may collect.

12. Apparatus for use in the purification of liquid containing suspended particles, said apparatus comprising in combination a settling tank, means for delivering liquid to the tank, means defining a dispersion chamber at one end of the tank constructed and arranged to deliver the liquid into the tank proper at substantially uniform velocity throughout the entire vertical cross-sectional area of the tank, means defining a collection chamber adjacent to the effluent end of the tank, said latter chamber being constructed and arranged to receive the liquid from the tank proper at substantially uniform velocity over the entire vertical cross-sectional area of the tank, the space between said chambers constituting a settling zone in which the fluid velocity is low and wherein the liquid flows substantially horizontally and without change in direction, means for conducting fluid away from the collecting chamber, a moving floor for the settling zone on which settlings may collect, means for moving the floor in the same direction as the flow of fluid through the settling zone, and means for conducting away settlings delivered from the floor at the effluent end of the tank.

13. Apparatus for use in the purification of liquid containing suspended particles, said apparatus comprising a settling tank for liquid containing suspended particles, means for distributing the liquid to be purified substantially uniformly over the entire vertical cross-sectional area of the tank at the inlet end of the latter, and a moving floor for said tank, said floor comprising a series of flights which normally overlap to form a continuous support for sludge, spaced parallel rails supporting and guiding the opposite ends respectively of the several flights, and means for moving the flights in succession along said guide rails.

14. Apparatus for use in the purification of liquid containing suspended particles, said apparatus comprising a settling tank for liquid containing suspended particles, means for distributing the liquid to be purified substantially uniformly over the entire cross-sectional area of the tank at the inlet end of the latter, and a moving floor for said tank, said floor comprising a series of flights which collectively constitute a continuous support for sludge, endless chains having substantially parallel runs, means pivotally uniting each flight to each chain, means for moving the chains in the same direction as the liquid flow through said tank, and means for supporting and guiding the flights as they are so moved by the chains.

15. Apparatus of the class described comprising a settling tank for liquid containing suspended particles, means dividing the lower part of the tank into a plurality of longitudinally extending channels, and a moving floor section for each channel, each floor section comprising a series of substantially rigid flights which collectively constitute a continuous support for sludge, means adjacent to each side wall of each channel for supporting and guiding the flights constituting the floor section for said channel, a pair of rotary shafts extending transversely of the tank, sprocket wheels carried by the shafts, sprocket chains having parallel runs actuated by said sprocket wheels, means connecting the flights of the floor sections to certain of said sprocket chains, and means for driving at least one of said shafts thereby to move the several floor sections in unison.

16. That method of purifying liquid containing suspended particles which comprises admitting the liquid to be purified to a settling tank in the form of a multitude of jets of substantially uniform velocity of at least 0.5 foot per second distributed substantially uniformly throughout the entire cross-sectional area of the tank, the aggregate area of the jets being small as compared with the cross-sectional area of the tank, causing the fluid admitted in said jets to flow toward the opposite end of the tank at a velocity of not more than 3 feet per minute, causing the particles which collect at the lower part of the tank to move slowly toward the effluent end of the latter at a uniform velocity, and causing the purified liquid to leave the tank proper in a multitude of jets at a substantially uniform velocity of not less than 0.5 foot per second distributed substantially uniformly throughout the entire cross-sectional area of the tank, the aggregate area of said jets being small as compared with the cross-sectional area of the tank.

17. That method of purifying liquid containing suspended particles, which comprises first distributing the liquid and its suspended particles substantially uniformly transversely of the width of the tank near one end of the latter by causing the liquid to discharge through a plurality of orifices in which the velocity of flow is substantially uniform, then distributing the liquid substantially uniformly both transversely and vertically of the cross-sectional area of the tank by discharging it through a plurality of orifices in which the velocity of flow is substantially uniform, the aggregate area of said orifices being small as compared with the cross-sectional area of the tank perpendicular to the direction of discharge through the orifices, and causing the fluid slowly to flow through the tank without substantial change in direction for a distance sufficient to permit the required removal of suspended particles by settling.

18. Apparatus for use in the purification of liquid containing suspended particles, said apparatus comprising a settling tank, means dividing the lower part of the tank into a plurality of longitudinally extendng channels, and a moving floor section for each channel, each floor section being designed and arranged to form a continuous support for sludge, means adjacent to each side wall of each channel for supporting and guiding the floor section for said channel, a pair of rotary shafts extending transversely of the tank, sprocket wheels carried by the shaft, sprocket chains having parallel runs actuated by said sprocket wheels, means connecting the floor sections to certain of said sprocket chains, and means for driving at least one of said shafts thereby to move the several floor sections in unison.

THOMAS R. CAMP.